United States Patent [19]

Zangs

[11] 4,207,060
[45] Jun. 10, 1980

[54] VESSEL FOR METAL SMELTING FURNACE

[75] Inventor: Ludger Zangs, Essen, Fed. Rep. of Germany

[73] Assignee: DEMAG, AG, Dusseldorf, Fed. Rep. of Germany

[21] Appl. No.: 918,942

[22] Filed: Jun. 26, 1978

[30] Foreign Application Priority Data

Oct. 11, 1977 [DE] Fed. Rep. of Germany ....... 2745622

[51] Int. Cl.² .......................................... F27D 15/02
[52] U.S. Cl. ................................... 432/77; 266/241; 432/238
[58] Field of Search ................ 432/77, 233, 237, 238; 266/241

[56] References Cited

U.S. PATENT DOCUMENTS

| | | | |
|---|---|---|---|
| 2,671,658 | 3/1954 | Moore | 266/241 X |
| 3,034,776 | 5/1962 | Hennenberger et al. | 432/238 X |
| 3,843,106 | 10/1974 | Nanjyo et al. | 266/241 |
| 3,963,223 | 6/1976 | Eysn | 266/241 |

FOREIGN PATENT DOCUMENTS

| | | | |
|---|---|---|---|
| 653798 | 12/1962 | Canada | 432/238 |
| 1029020 | 4/1958 | Fed. Rep. of Germany | 432/238 |
| 2354570 | of 1974 | Fed. Rep. of Germany | |
| 2502712 | of 1975 | Fed. Rep. of Germany | |
| 2612659 | of 1976 | Fed. Rep. of Germany | |
| 394647 | of 1974 | U.S.S.R. | 432/233 |

Primary Examiner—John J. Camby
Attorney, Agent, or Firm—Mandeville and Schweitzer

[57] ABSTRACT

A vessel for a metal smelting furnace is disclosed. The vessel is provided with a heat-resistant interior wall and means for cooling the portions of said interior wall above the smelting zone. In accordance with the invention, the cooling means comprises an interior wall at least partially formed by at least one cooling pipe coil wherein the coil includes thick-walled pipes and neighboring sections of the coil are arranged in a closely adjacent relation. A cooling medium such as water is fed through the pipe coil under high pressure to dissipate heat from the interior wall of the vessel.

19 Claims, 8 Drawing Figures

U.S. Patent    Jun. 10, 1980    Sheet 1 of 5    4,207,060
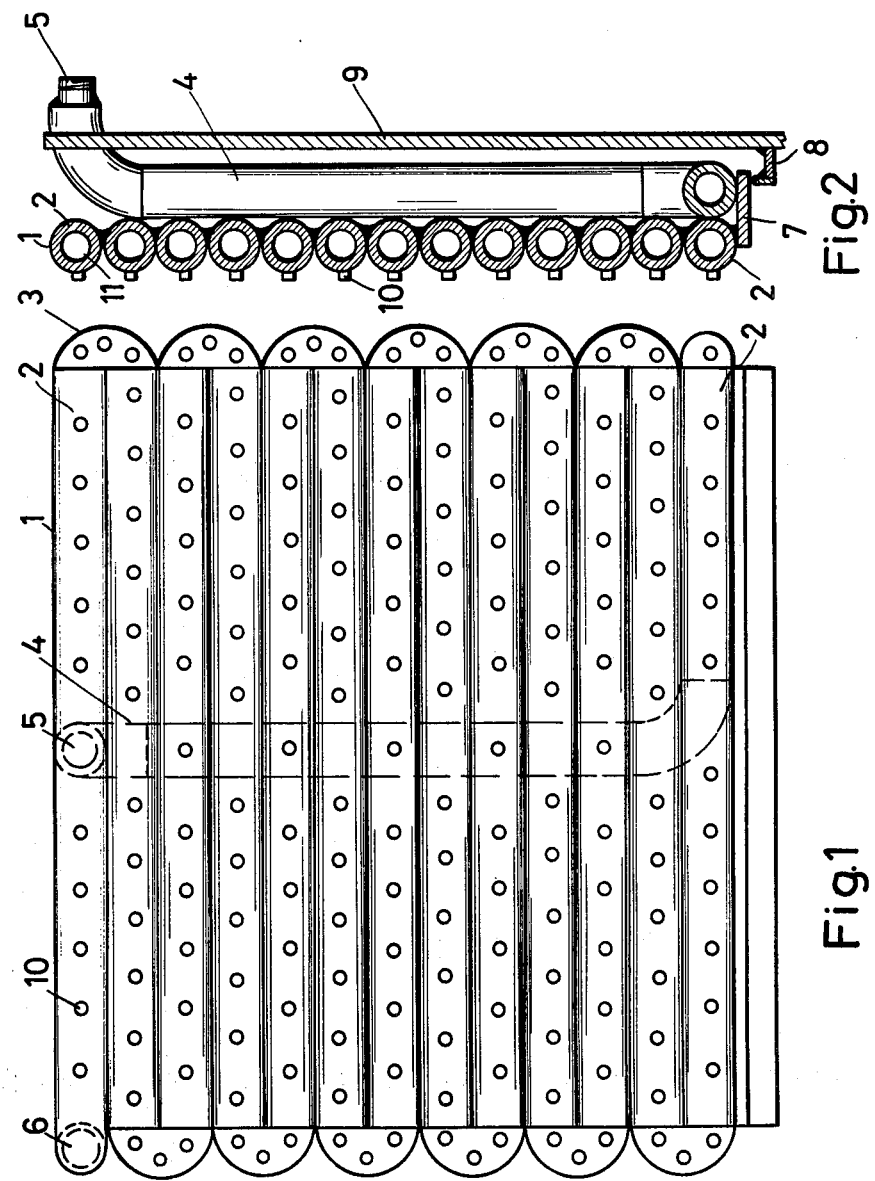

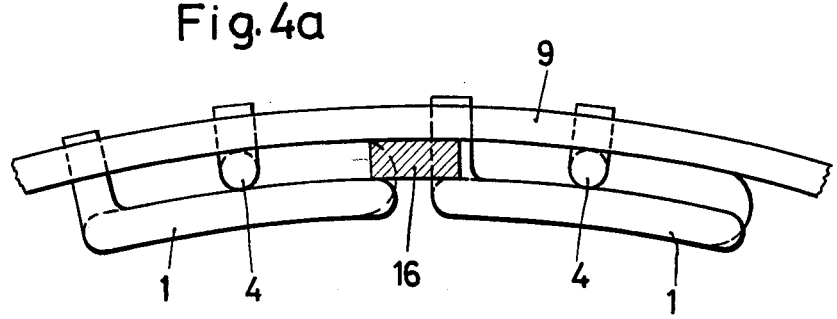
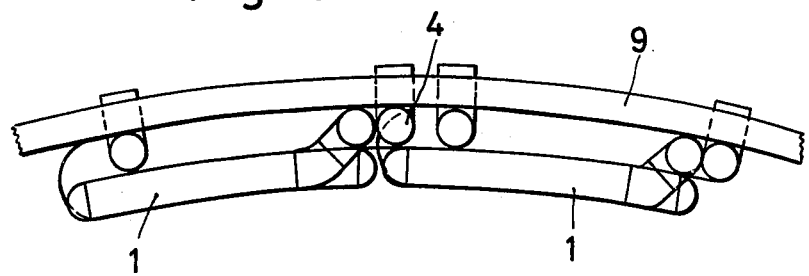
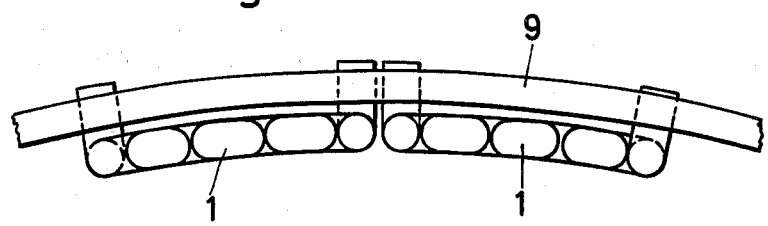

VESSEL FOR METAL SMELTING FURNACE

BACKGROUND AND SUMMARY OF THE INVENTION

All over the world, the electric arc smelting furnace is considered to be an important apparatus in the production of steel from scrap and, increasingly, from pelletized iron sponge. This smelting apparatus is presently designed as a welded steel structure, protected against the high temperatures of the furnace by a refractory lining on the vessel wall as well as on the lid. The lining protects the steel structure against thermal, chemical and mechanical stresses, which are of sufficient magnitude to greatly limit the life of the refractory lining, e.g., 150 charges in the smelting area and about 100 charges at the lid. Accordingly, furnace production must be interrupted at intervals in order to install a new lining. These interruptions lead to a decrease in production and furthermore constitute a considerable percentage of operating expenses. For these reasons, water-cooled wall and lid treatments have been developed and water-cooled wall elements have been used to replace the refractory lining in portions of the furnace vessel outside of the smelting area. Wall elements of this type are already being offered for sale.

German Offenlegungsschrift No. 2 502 712 discloses water-cooled metal boxes to cool vessel walls of light arc furnaces. These boxes have the disadvantage that no reliable water force may be developed. Therefore, there is always a danger of water turbulence or dead flow areas in corners wherein water vapor and air bubbles may form. The formation of vapor and air bubbles causes a sudden drop in heat transfer causing local overheating which might lead to fusion of the box walls. Such burn-outs lead to additional operating disruptions and are a threat to the safety of furnace operation. Another disadvantage, being of importance in view of a possible energy recovery from the cooling water, is the fact that stress factors do not permit using cooling agents under increased pressure in connection with these cooling boxes. This would require thick-walled boxes necessitating an unduly heavy construction.

Another construction of cooling boxes for a blast furnace is disclosed in German Offenlegungsschrift No. 2 612 659. Each cooling box is provided with several cooling water channels bound by horizontal partitions whereby turbulence or vapor back-up is avoided. The cooling boxes are, however, imbedded in the furnace wall lining and are not pertinent to the teachings disclosed herein. Furthermore, the proposed cooling boxes comprise a very complex structure and the expensive casting process utilized to manufacture the cooling boxes results in a heavy construction.

A disclosed smelting furnace vessel (German Offenlegungsschrift No. 2 354 570) has a furnace wall constructed of coolers arranged at the furnace floor. Each cooler consists of a main body of cast iron or copper with a number of cooling pipes arranged within the main body. The coolers are provided either at the so-called hot spots of the furnace walls, or the walls themselves comprise several coolers. The furnace disclosed in German Offenlegungsschrift No. 2 354 570 has many disadvantages. The furnace wall of cooling blocks is relatively heavy necessitating a reinforced construction for the bottom portion of the furnace. Due to the thickness of the ingot and poor heat transfer between the casting and cooling pipes, the cooling blocks are subject to considerable wear by combustion requiring replacement after a certain period of operation. Since relatively thin-walled cooling pipes must be utilized in order to permit sufficient heat dissipation, operation with a cooling medium under high pressure is not possible. Due to the great mass of the cooling blocks, the temperature of the cooling medium is relatively stable vis-a-vis a change in thermal stress caused by actual furnace conditions. Thus, this system is not entirely suitable to control a furnace operation.

It is the object of the present invention to provide a vessel for a metal smelting furnace, particularly an electric furnace, of the type mentioned above, which is of a simple, relatively light, structure and relatively inexpensive to manufacture. Another object of the invention is to provide a cooling system operable under high pressure resulting in an improved heat transfer at the vessel walls. Simultaneously, the vessel wall has a low heat change inertia in order to facilitate control of the furnace operation. Moreover, the furnace wall is constructed whereby a minimum of combustion of wall material occurs. The invention solves the above-discussed shortcomings of the prior art by providing a vessel interior wall which includes at least one cooling pipe coil, spaced from the vessel center, and comprising thick-walled pipes or pipe sections arranged in a closely adjacent relation. The result is a furnace vessel of straightforward design, lightweight construction and which may be erected at reduced manufacturing costs. The light construction of the furnace wall requires no reinforced structure for the bottom part of the furnace. The furnace wall construction permits faultless forced guidance of the cooling water thus largely avoiding thermal stress and local overheating which results in a prolongation of the life of the furnace. The pipes used for the cooling coils have a great torsion and bending strength as well as a high resistance—due to the wall thickness—to shock-like external mechanical stress. Residual thermal stress is better absorbed by a circular pipe cross-section than, for example, by a rectangular cross-section.

In accordance with another feature, the cooling pipe coil consists of U-shaped or helically coiled pipes, whereby the adjacent sections of the cooling pipe coil are arranged either parallel with or at right angle to the furnace vessel axis. From a technological point of view, it has been found advantageous to manufacture the cooling pipe coils by bending. The pipe coils may be interconnected by welding. According to additional features of the invention, the cooling pipe coil may be constructed so that its pipes and/or pipe sections are longitudinally partitioned and connected by a plate towards the center of the vessel.

The cooling pipe coil may comprise pipe sections open on both ends with the open ends of two adjacent pipe sections being interconnected by welded caps. In accordance with another advantageous feature of the invention, the open pipe ends at each side of the coil are seal-welded to a compact joint with deflection channels arranged opposite the pipe ends. According to another feature of the invention, the cooling pipe coil is connected at one end to the cooling medium supply line and at the other end to the cooling medium discharge line, whereby the cooling medium supply line and discharge line is formed by at least one downwardly extending pipe. In order to enlarge the interior pipe surface, to improve thermal conductivity, the inside of the pipe may be profiled.

During furnace operation, a slag layer of about 10 to 20 mm thickness forms on the pipe surfaces facing the center of the vessel. This slag layer acts as a thermal and electric insulator decreasing the risk of local overheating even further, reducing thermal stress and achieving a decrease in energy dissipation via the cooling water. The electric insulating effect of the slag layer offers extensive protection against disruptive discharge flashover and/or secondary electric arcs from the scrap to the cooling coil. Such disruptive discharges, however, are improbable, as the electric resistance over the great distance across the pipe wall is too high. In order to further the formation of a slag layer on the pipe surface, the cooling pipe coil is, at the side close to the furnace center, equipped with prominences, preferably burls, pins, ribs, or the like.

It has been found extremely advantageous to have cooling fluid under high pressure flow through the cooling pipe coil. The use of forced flow for the cooling water ensures greater safety of operation and avoids turbulence or stationary flow zones with the attendant risk of local overheating by formation of vapor pockets. Moreover, forced flow provides uniform cooling and lower thermal stress and relatively exact adjustment of the flow velocity as well as flow volume. The cooling pipe coil is best suited for the forced flow of cooling water.

According to additional features of the invention, the individual cooling pipe coils are easily replaced in case of damage by dismantling them in either the radial or axial direction. For safety reasons, another feature of the invention provides that the lowest portion of each cooling coil is welded to the inside rim of a circular drain running essentially at right angle to the furnace interior wall to trap water. A trench may be provided at the furnace shell below the lower edge of the drain.

In one embodiment of the furnace vessel of the present invention, the wall is made up solely of the cooling pipe coils which are attached to girders forming a wall skeleton. Portions of this skeleton may be arranged to be tiltable or detachable doors each consisting of a girder frame encompassing one or several cooling pipe coils. In a further favorable development of the invention it is suitable to match the cooling pipe coils to the shape of the vessel—seen in planview—by bending, folding or juxtaposing. Each cooling pipe coil surface may be provided with an insulating coating of, for example, a ceramic material, such as enamel.

The furnace wall construction of the invention makes it possible to use a fast-reacting monitor system. The ratio between heat dissipated by the cooling water and heat supplied by electric energy is particularly favorable in the operation of an electric smelting furnace with a vessel built in accordance with the invention. The favorable thermal conditions as well as the longer life of the vessel wall are further promoted by conditions existing during the melting down phase of the smelting cycle. For example, the cooling effect of the charge material and protection against light arc radiation due to the large effective capacity of the furnace. Moreover, the slag layer on the cooling coil surface facilitates heat transfer between the furnace chamber, pipe wall, and cooling water, while the respective slag cover on the smelt reduces heat radiation off the bath.

BRIEF DESCRIPTION OF THE DRAWINGS

FIG. 1 is a front plan view of a cooling coil built in accordance with the principles of the present invention.

FIG. 2 is a side cross-sectional view of the cooling coil of FIG. 1 mounted to the interior wall of the furnace vessel.

FIGS. 4a, 4b and 4c illustrate several arrangements for the side-by-side mounting of cooling coils on the interior wall of the furnace vessel.

DETAILED DESCRIPTION OF PREFERRED EMBODIMENTS OF THE INVENTION

Figure 3:
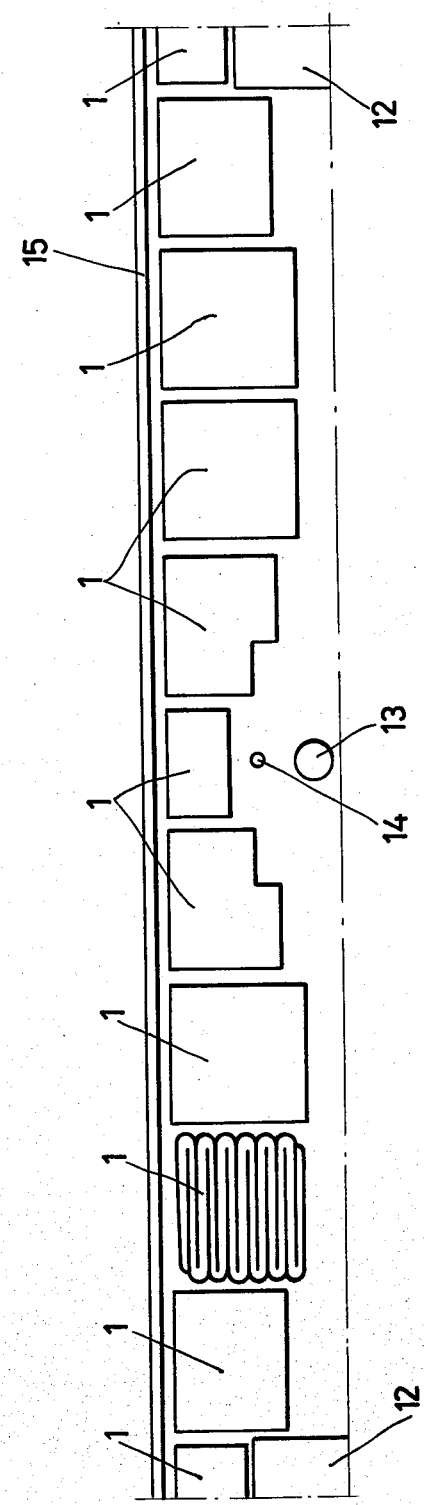
FIG. 3 is a schematic diagram of a furnace interior wall in an unfolded view illustrating a preferred arrangement for a plurality of cooling coils mounted on the interior wall.

Referring initially to FIG. 1, there is illustrated a cooling pipe coil 1 forming a part of the vessel interior wall according to the invention. Cooling pipe coil 1 comprises a plurality of closely adjacent, individual pipe sections 2, preferably welded together. Each pipe section 2 includes two open ends and caps 3 are welded to the open pipe ends to provide flow between neighboring pipe sections 2. The cooling pipe coil 1 is connected to a down pipe 4, through which the cooling water is fed under high pressure to the lowermost pipe section 2. Cooling water outlet 6 is provided at one end of the uppermost pipe section 2 of the cooling pipe coil 1.

FIG. 2 is a side cross-sectional view of the coil 1 of FIG. 1 and illustrates the manner in which the individual pipe sections 2 are welded together. One side of the cooling pipe coil 1 faces the metal outer shell 9 of the furnace and the other side of the coil is arranged to face the center of the vessel. The side of the coil 1 facing the vessel center is fully exposed to the interior of the vessel and is provided with a plurality of burls 10 arranged in a lattice system (FIG. 1). The burls 10 serve to retain the splattered slag sticking to the cooled surface of cooling pipe coil 1. Eventually, a durable slag layer of 10 to 20 mm thickness forms on the burl side of the cooling pipe coil 1. The lowermost pipe section 2 of the coil 1 is connected to the inner edge of a drain 7 by welding. Trench 8, welded to the outer shell 9, is arranged below the outer edge of the drain 7. The cooling coil 1 may be formed from a plurality of U-shaped, thick-walled pipe sections or the coil 1 may be arranged in a helical configuration.

FIG. 3 illustrates an arrangement of several cooling coils 1, 1', 1" on a furnace wall, each comprising a U-shaped pipe. The adjacent pipe pieces run at right angles to the furnace vessel axis. The cooling coils vary in size, as required. For example, smaller cooling coils 1" are provided in the area of the furnace door 12 and tap 13 and/or overflow 14. The coils 1' neighboring the cooling coils 1" in the area of the tap 13 are slightly different in shape. Individual coils 1, 1', 1" are arranged as closely together as possible. The lower edges of the coils 1 are located in the range from 300 to 500 mm above the slag level, thus avoiding direct contact between the pipes and the bath. The wall areas near tap 13 and/or furnace door 12 which are not cooled are lined with refractory bricks. The upper edges of the coils are positioned just below the upper vessel edge 15.

Naturally, the cooling coils may be arranged in such a fashion that the adjoining pipe pieces run parallel with the furnace vessel axis or the pipe coil forming the vessel wall may consist of a helically coiled pipe. To advantage, the cooling coils may be installed in existing plants after slight alterations to the furnace vessel.

FIGS. 4a and 4b show the side-by-side relation of adjacent cooling pipe coils 1. In order to avoid overheating at outer shell 9 in the areas of the gaps between neighboring cooling coils, such gaps being small but inevitable due to structural requirements, a pile of refractory bricks 16 is positioned in the gap area according to FIG. 4a. A modified solution of heat screening in the gap area is shown on FIG. 4b, whereby the down pipe 4 (see FIG. 2 as well) is arranged so that it straddles the gap. If the cooling coils are wound vertically, as illustrated in FIG. 4c, the individual cooling coils may be arranged very close together so that no additional heat screening of outer shell 9 is required.

Figure 5:
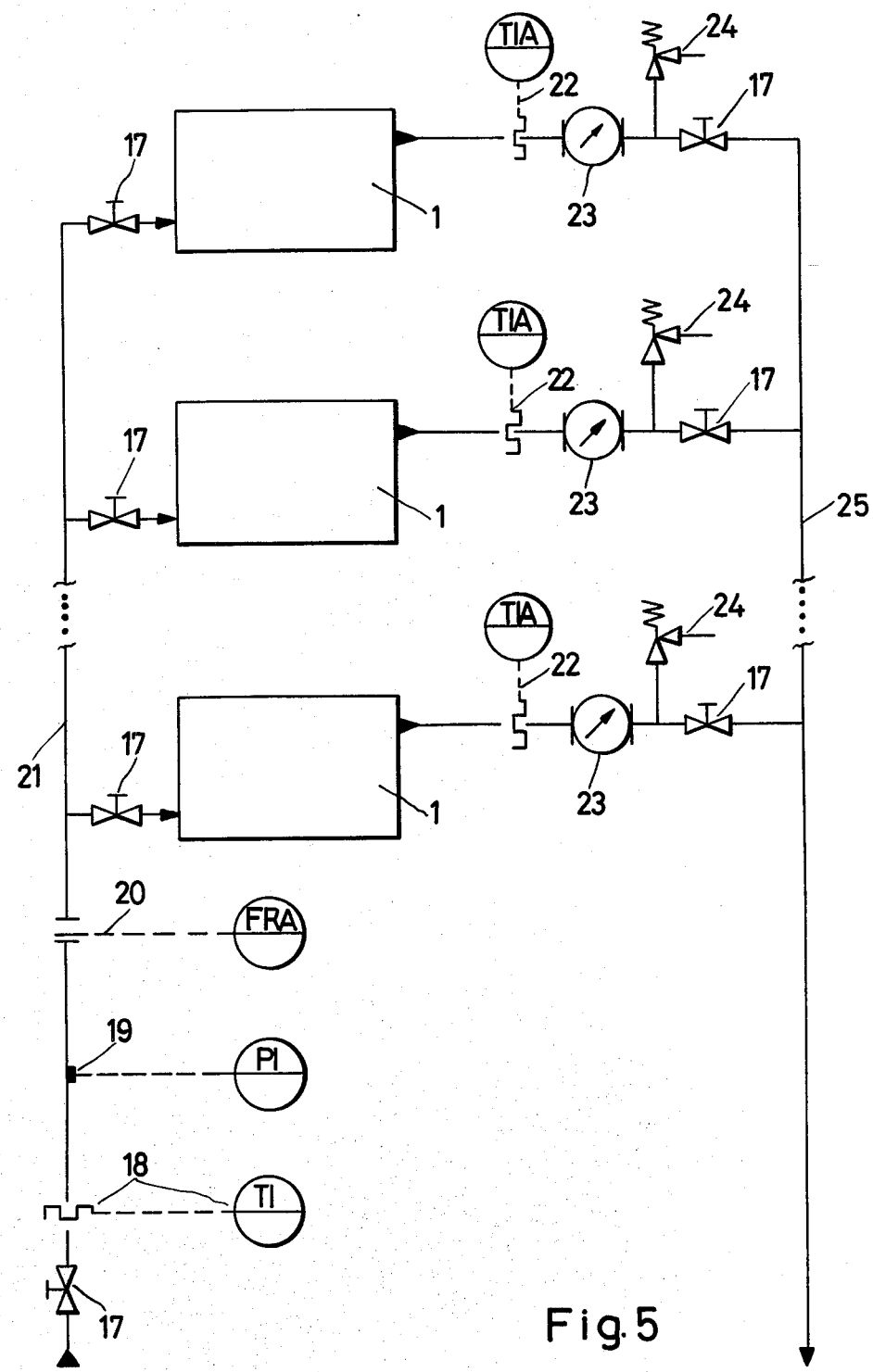
FIG. 5 is a simplified schematic diagram illustrating a furnace monitoring system used in connection with the cooling coils of the present invention.

FIG. 5 shows an example of a monitoring system for the cooling system. The cooling system operates in accordance with the principle of a forced flow for the cooling fluid, whereby the water requirement is 7 to 9 $m^3$ per $m^2$ of supplied surface. If the water inlet temperature is between 15° to 30° C., the outlet temperature will be slightly over 60° C. to 65° C. at a water pressure of 4 to 5 bar. The flow velocity is approximately 2 to 4 m/sec. Normal cooling water may be used as cooling medium. In the example shown on FIG. 5 three cooling coils (pipe wall elements) 1 are connected to the cooling medium circulation system. The cooling water supply line 21 is provided at the inlet with a check valve 17. The lines for each cooling coil 1 are each provided with a check valve 17. At the cooling water supply line the temperature is measured by a temperature gage 18 and the pressure of the cooling water is measured by pressure gage 19. Furthermore, a flowmeter 20 is installed in the supply line operating in conjunction with an alarm system which triggers an alarm if a minimum value is not reached. The cooling water discharge line 25 and/or the connecting lines between cooling pipe coils and discharge line 25 are each supplied with a temperature gage 22 as well as a flow guard 23. The guard monitors the volume flow; if it falls short of a set minimum value a signal is triggered and/or the furnace is shut down. This is to avoid starting the furnace if, for example, control or check valves are locked. In the direction of the cooling medium flow following each flow guard 23 a pressure-relief valve 24 is provided with set threshold of response of about 6 bar to blow off steam when exceeding the set pressure; also, a check valve 17 is provided. Before the cooling water leaves the system, a temperature gage 26 is provided. If the water temperature exceeds a predetermined value (about 65° C.) an alarm is triggered. Either the furnace capacity is to be lowered or water flow in the cooling pipe coils must be increased.

The monitor system described guarantees a high degree of safety in furnace operation by constantly monitoring the operation of the cooling system. The safety is still increased—as already mentioned—by using thick-walled pipes on the vessel wall thus eliminating the risk of damage through overheating. The arrangement of the pipe wall above the slag level (FIG. 3) avoids any contact between the liquid smelt and pipes, thus preventing any damage. Nevertheless, should a sudden leak occur in the cooling system, the leaking water would first be directed to the outside by means of the drain 8 (FIG. 2) so that it does not flow behind the brick lining. If operation is performed with water under high pressure, the water would evaporate immediately in the event of a sudden leak before ever touching the metal bath.

Figure 6:
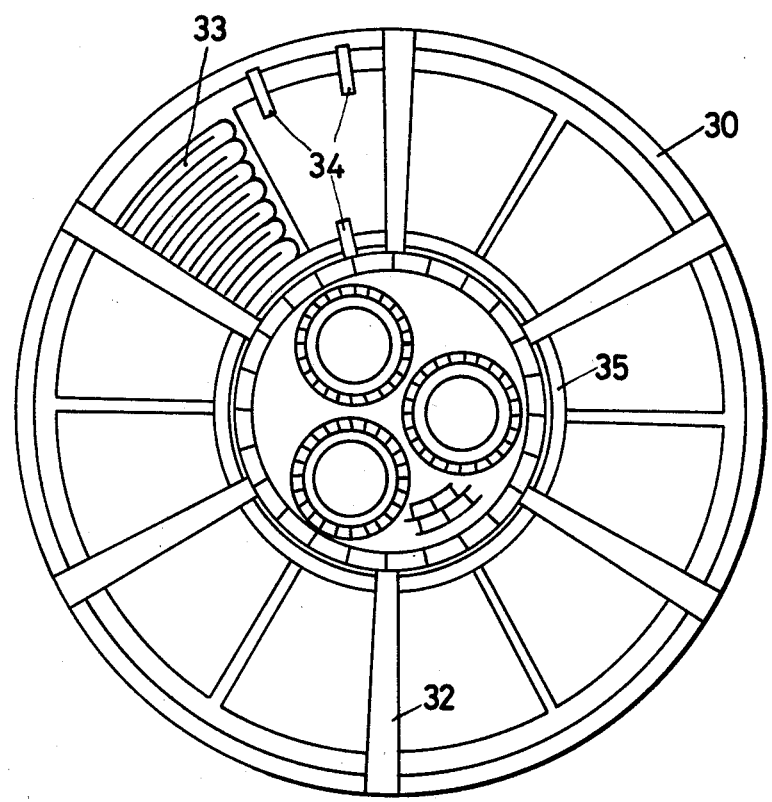
FIG. 6 is a top plan view of a lid structure for the furnace vessel.

FIG. 6 shows a lid for a furnace, of the above-described type. The lid consists of an outer ring 30 and inner ring 35 connected by means of cantilevers 32. Between the two annular supports 30 and 35 segment-like cooling coils 33 are provided which are attached to the rings by means of suspensions 34. Cooling coils 33, being of identical or similar shape as the cooling coils 1 forming the vessel wall (FIG. 1), are advantageous for manufacturing reasons. The space between inner annular support 35 and electrodes is filled by refractory lining, which is arranged around the electrodes in the usual manner.

I claim:

1. A vessel for a metal smelting furnace having a smelting zone including a heat-resistant interior wall, and cooling means for protecting the interior of said vessel, characterized by
    (a) at least a portion of the interior wall of said vessel above the smelting zone consisting of at least one cooling pipe coil;
    (b) said coil including fluid passage-forming sections;
    (c) said cooling pipe coil being exposed to the center of the vessel, and
    (d) neighboring sections of said coil being arranged in a contacting relation.

2. The cooling means of claim 1, further characterized by
    (a) said cooling pipe coil comprising a plurality of U-shaped pipes.

3. The cooling means according to claim 1, further characterized by
    (a) said cooling pipe coil comprising helically coiled pipes.

4. The cooling means according to claim 1, further characterized by
    (a) said vessel including a central axis;
    (b) the longitudinal axis of said fluid passage-forming sections being arranged in a parallel relation to the central axis of said vessel.

5. The cooling means according to claim 1, further characterized by
    (a) said vessel including a central axis;
    (b) the longitudinal axis of said fluid passage-forming sections being arranged in a perpendicular relation to the central axis of said vessel.

6. The cooling means according to claim 1, further characterized by
    (a) said fluid passage-forming sections comprising individual pipe sections.

7. The cooling means according to claim 6, further characterized by
    (a) each of said pipe sections being connected along its length to the neighboring pipe sections of said cooling pipe coil by a welded joint.

8. The cooling means of claim 6, further characterized by
    (a) each of said pipe sections comprising an open-ended, longitudinally elongated pipe, and
    (b) means interconnecting the open ends of two closely adjacent pipes and providing flow communication therebetween.

9. The cooling means of claim 8, further characterized by (a) said interconnecting means comprising a hollow U-shaped cap element.

10. The cooling means according to claim 1, further characterized by (a) said cooling pipe coil being connected at one end thereof to a cooling fluid supply line and at the other end thereof to a cooling fluid discharge line.

11. The cooling means according to claim 10, further characterized by (a) said cooling fluid supply and discharge lines being at least partially formed by at least one downwardly extending pipe.

12. The cooling means according to claim 1, further characterized by (a) one surface of said cooling pipe coil including a plurality of projections.

13. The cooling means according to claim 12, further characterized by (a) said projections comprising burls.

14. The cooling means according to claim 1, further characterized by (a) means for circulating a cooling fluid through said cooling pipe coil under high pressure.

15. The cooling means according to claim 14, further characterized by (a) said cooling fluid comprising water.

16. The cooling means according to claim 1, further characterized by (a) said cooling pipe coil including a drain channel mounted along the lowermost end thereof.

17. The cooling means of claim 16, further characterized by (a) a trench-like channel associated with said drain channel and arranged immediately below said drain channel.

18. The cooling means of claim 1, further characterized by (a) said interior wall consisting of a plurality of cooling pipe coils, and (b) a plurality of girders forming a wall skeleton to support said cooling pipe coils.

19. The cooling means according to claim 18, further characterized by (a) said plurality of cooling pipe coils being mounted to said vessel in an array generally adapted to the internal configuration of said vessel.

* * * * *